United States Patent [19]

Delattre et al.

[11] Patent Number: 5,204,605
[45] Date of Patent: Apr. 20, 1993

[54] POSITION-CONTROLLED ACTUATOR

[75] Inventors: Jacques Delattre, Valpuiseaux; Philippe Gouze, Villemoisson, both of France

[73] Assignee: Societe de Fabrication d'Instruments de Mesure (S.F.I.M.), Massy Cedex, France

[21] Appl. No.: 764,322

[22] Filed: Sep. 24, 1991

[30] Foreign Application Priority Data

Sep. 24, 1990 [FR] France .................. 90 11739

[51] Int. Cl.⁵ .................................. G05B 1/00
[52] U.S. Cl. .......................... 318/721; 318/652
[58] Field of Search ........................ 318/626–628, 318/549, 666, 663, 721, 652, 615, 638, 700, 715, 599, 610, 461, 466, 449

[56] References Cited

U.S. PATENT DOCUMENTS

| | | | |
|---|---|---|---|
| 2,695,145 | 11/1954 | Lear et al. | 318/628 |
| 3,219,782 | 11/1965 | Bissell et al. | 318/549 |
| 4,259,627 | 3/1981 | Matsuno et al. | 318/626 |
| 4,429,262 | 1/1984 | Utenick | 318/627 |
| 4,492,907 | 1/1985 | Fabian et al. | |
| 5,068,584 | 11/1991 | Herent et al. | 318/549 |

FOREIGN PATENT DOCUMENTS 0021968 1/1981 European Pat. Off. .
0360099 3/1990 European Pat. Off. .
2132385 7/1984 United Kingdom .

Primary Examiner—A. Jonathan Wysocki
Attorney, Agent, or Firm—Jacobson, Price, Holman & Stern

[57] ABSTRACT

A position-controlled actuator includes a motor supplied with power by a power supply circuit controlled at least by an error signal. A speed reducer converts rotary movement of the motor into linear movement over a given travel. An output sensor indicates the position of the actuator and an error signal computation circuit compares a commanded position of the actuator to a calculated position. The output sensor supplies a binary position signal taking two different values according to the position of the actuator relative to its mid-travel position. The binary position signal is applied to a power up logic circuit which, when the actuator receives an activation instruction, switches the input of the motor power supply circuit to the output sensor so as to apply the binary position signal to the motor power supply circuit until the value of the binary position signal changes, whereupon the power up logic circuit switches the input of the motor power supply circuit to the output of the error signal computation circuit. The calculated position of the actuator is supplied by a circuit receiving a motor position signal from at least one motor sensor on the motor. One application of the actuator is to autopilot flight control of a helicopter.

5 Claims, 2 Drawing Sheets

POSITION-CONTROLLED ACTUATOR

BACKGROUND OF THE INVENTION

1. Field of the invention

The present invention concerns a position-controlled actuator comprising a motor supplied with power by a power supply circuit controlled at least by an error signal, a speed reducer converting rotary movement of said motor into linear movement over a given travel, an output sensor indicating the position of the actuator and an error signal computation circuit comparing a commanded position of the actuator with a computed position.

The invention applies in particular to autopilot control of an aircraft, especially a helicopter, to control the position of the aircraft in space.

2. Description of the prior art

In a prior art position-controlled actuator as described above the motor is a commutator-type direct current motor driving a speed reducer comprising a torque limiter and a lead screw type gearbox.

The output sensor is a pair of potentiometers coupled to the output rod which deliver a signal proportional to its elongation, representing the calculated real position of the actuator. This signal is applied to the error signal computation circuit which, if the calculated actuator position is different than the commanded position, supplies a non-null error signal to a power amplifier which energizes the motor until the error signal is cancelled out, at which the time the calculated actuator position is coincident with the commanded value.

Generally speaking, the control and power circuits of the actuator described above are incorporated into the autopilot computer, for example, and in any event are external to the casing containing the mechanical parts of the actuator.

The prior art actuator has a number of drawbacks. With reference to the actuator itself, the commutator-type motor and the potentiometer are subject to friction wear of the electrical contacts (motor brushes and potentiometer cursors). This limits the service life of the actuator and requires frequent dismounting to replace the worn parts. Likewise the torque limiter, beneficial with respect to abutment engagement at maximum speed, is also subject to friction wear. With regard to the control system, the error signal computation circuit or control amplifier is remote from the actuator, implying a large number of connecting wires between the amplifier and the actuator (two motor wires and three wires per potentiometer). Also, the current drawn by the motor and supplied by the power amplifier flows in long wires with the risk of radiated interference affecting nearby wiring and equipment.

One object of the present invention is to overcome the technical problem of providing a position-controlled actuator as described above in which the components subject to friction wear are eliminated so as to increase the service life of the actuator and reduce its maintenance requirements.

Another technical problem to be overcome is that of reducing the number of connecting cables between the autopilot computer and the actuator.

SUMMARY OF THE INVENTION

The present invention consists in a position-controlled actuator comprising a motor adapted to be supplied with power by a power supply circuit controlled at least by an error signal, a speed reducer converting rotary movement of said motor into linear movement over a given travel, an output sensor indicating the position of the actuator and an error signal computation circuit comparing a commanded position of the actuator to a calculated position, wherein said output sensor supplies a binary position signal taking two different values according to the position of the actuator relative to the mid-travel position of said actuator, said binary position signal being applied to a power up logic circuit which, when the actuator receives an activation instruction, switches the input of the motor power supply circuit to the output sensor so as to apply the binary position signal to said motor power supply circuit until the value of the binary position signal changes, whereupon the power up logic circuit switches the input of the motor power supply circuit to the output of the error signal computation circuit, the calculated position of the actuator being supplied by a circuit receiving a motor position signal from at least one motor sensor on said motor.

This solution eliminates the causes of friction wear. The potentiometers which indicate the position of the actuator are dispensed with and replaced by a contactless output sensor (binary on/off signal) giving the mid-travel position of the actuator. The torque limiter is dispensed with and torque limiting provided by the motor control electronics. Finally, a brushless motor can be used. Said motor may be a synchronous motor whose power supply circuit includes a pulse width modulator converting an input voltage into pulses with a duty cycle varying in proportion to said input voltage, a motor control logic circuit supplying a motor phase power supply instruction depending on the position of the rotor relative to the stator given by the motor position signal and the sign of the input voltage, the motor phase power supply being modulated by the signal from said pulse width modulator, and a power module providing an interface between the control logic circuit and the motor.

Finally, the various motor control and power supply circuits can be integrated into the actuator. This reduces the number of connections between the autopilot computer and the actuator. The power needed to operate the actuator is taken directly from the helicopter's electrical system, for example.

The following description with reference to the appended drawings given by way of non-limiting example only explains in what the invention consists and how it may be put into effect.

DETAILED DESCRIPTION OF THE INVENTION

Figure 1:
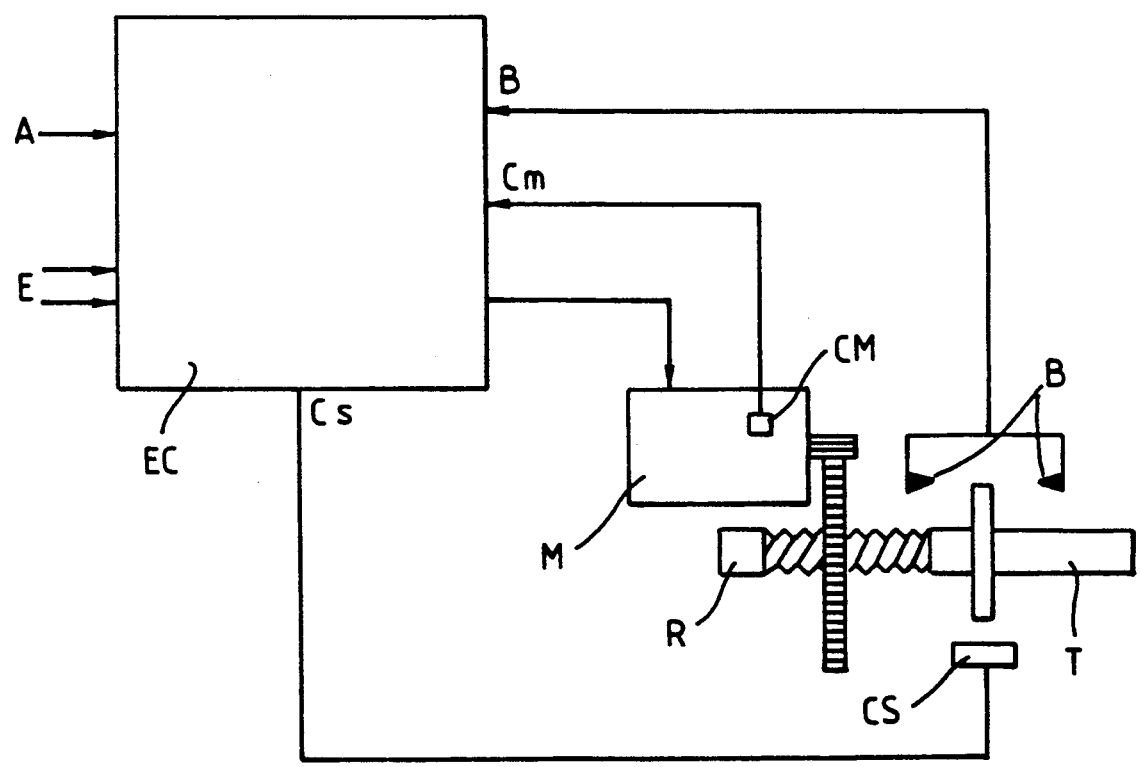
FIG. 1 is a block diagram of a position-controlled actuator in accordance with the invention.
Figure 2:
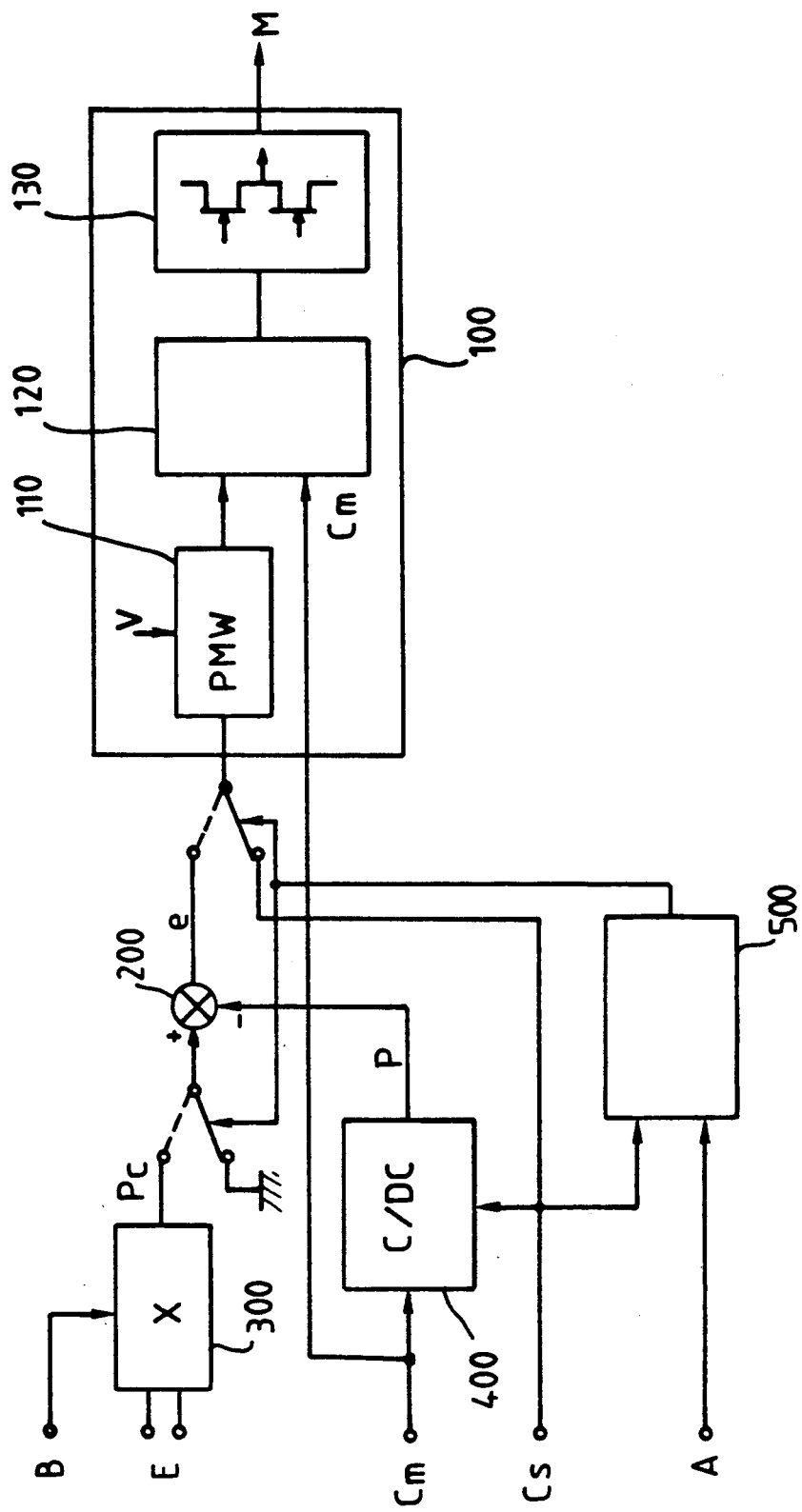
FIG. 2 is a block diagram of the control electronics for the actuator from FIG. 1.

The FIG. 1 block diagram shows a position-controlled actuator for helicopter flight control, for example, comprising a brushless synchronous motor M supplied with power by a power supply circuit 100 shown in the FIG. 2 block diagram. The motor power supply circuit is controlled by an error signal provided in known manner by a computation circuit 200 (a differential amplifier, for example) on the basis of comparing a commanded position $P_c$ of the actuator and a calculated position P:

$$e = k(P - P_c)$$

As shown in FIG. 1, the actuator further comprises a speed reducer R, a lead screw type gearbox, for example, converting the rotary movement of the motor M into linear movement over a travel limited by abutments B. An output rod T transmits said linear movement to the flight control system (not shown in FIG. 1).

A Hall effect contactless output sensor CS supplies a binary position signal Cs taking two different values 1 or 0 (or + or −) according to the position of the actuator relative to the midpoint of its total travel. Referring to FIG. 2, on power up and after an activation signal A is received the binary position signal Cs is applied to a power up logic circuit 500 which switches the input of the motor power supply circuit 100 to the output sensor CS so that the binary position signal Cs is applied to the power supply circuit 100 so as to recenter the actuator, at which point said binary position signal changes value. This change is detected by the power up logic circuit 500 which then switches the input of the motor power supply circuit 100 to the output of the error signal E computation circuit 200. From this time the actuator is controlled by the input signal E. The input signal E is proportional, for example, to the difference $\theta - \theta_R$ between the actual roll or pitch attitude $\theta$ determined by the helicopter and a reference attitude $\theta_R$ to which the autopilot is set. The input signal is adapted so that the maximum travel of the actuator is always obtained for the same signal, irrespective of the authority L of the actuator.

The commanded position $P_c$ of the actuator is provided by an input matching circuit 300 as the product of the input signal E expressed as a percentage of the actuator authority by the actuator authority L determined by the abutments B limiting the travel of the output rod T:

$$P_c = E \times L$$

FIG. 1 shows that the synchronous motor M is provided with at least one Hall effect contactless type motor sensor CM supplying a signal Cm indicative of the position of the rotor of the motor. Given that the movement of the output rod T is directly proportional to the rotation of the motor M, because of the frictionless speed reducer R, the signal Cm from the motor sensor CM is used to control a circuit 400 giving the calculated position P of the actuator. In the FIG. 2 example, this circuit is a counter/downcounter which, to allow for any drift that may occur, is reset each time the binary position signal Cs value changes.

As shown in FIG. 2, the motor M power supply circuit 100 comprises a pulse width modulator (PWM) 110 which converts an input signal (either the error signal e or the binary position signal Cs) into pulses with a duty cycle proportional to said input voltage. The circuit 110 also supplies a signal indicating the rotation direction required of the motor according to the sign of the signal e or Cs. The pulses from the circuit 110 are passed to a motor control logic circuit 120 whose main function is to determine the order to energize the phases of the synchronous motor according to the position of its rotor relative to its stator and the sign of the input voltage. The supply of power to the phases of the motor M is modulated by the signal from the pulse width modulator 110. Finally, a power module 130 provides an interface between the control logic circuit 120 and the motor M. The motor control signals from the control logic are divided between the respective channels associated with each phase of the motor.

To reduce to three the number of wires connecting the autopilot computer to the actuator, the power up logic circuit 500, the motor power supply circuit 100, the error signal computation circuit 200, the counter/downcounter 400 and the input matching circuit 300 constituting the control electronics EC are integrated into the casing housing the actuator.

The invention is described above with reference to helicopter flight control but it is to be understood that it applies equally well to any type of position-controlled actuator.

We claim
1. Position-controlled actuator comprising:
   a motor,
   a power supply circuit to supply said motor with power,
   a speed reducer converting rotary movement of said motor linear movement over a given travel,
   at least one motor sensor on said motor supplying a motor position signal,
   a circuit receiving said motor position signal and supplying a calculated position of said actuator,
   an error signal computation circuit supplying said power supply circuit with an error signal between a commanded position of the actuator and said calculated position,
   an output sensor supplying a binary position signal taking two different values according to the position of the actuator relative to the said travel position of said actuator,
   a power up logic circuit receiving said binary position signal and an activation instruction,
   wherein said power up logic circuit, on receiving said activation instruction, switches the input of said power supply circuit to said output sensor so as to apply said binary position signal to said motor power supply circuit until the value of said binary position signal changes, whereupon said power up logic circuit switches the input of said motor power supply circuit to the output of said error signal computation circuit.

2. Actuator according to claim 1, wherein
   said motor is a synchronous motor, having a stator and a rotor,
   said power supply circuit comprises
   a pulse width modulator,
   a motor control logic circuit,
   a power module.,
   wherein
   said pulse width modulator comments an input voltage into pulses with a duty cycle proportional to said input voltage,
   said motor control logic circuit supplies a motor phase power supply instruction conditioned by the position of the rotor relative to the stator given by the motor position signal and the sign of the input voltage, the motor phase power supply being modulated by the signal from said pulse width modulator, and
   said power module provides an interface between said control logic circuit and said motor.

3. Actuator according to claim 1 wherein said circuit supplying said calculated position of said actuator is a counter/downcounter which is reset whenever said binary position signal value changes.

4. Actuator according to claim 1 wherein an input matching circuit supplies said commanded position of said actuator as the product of an input signal expressed as a percentage of the actuator authority by the actuator authority as determined by two abutments delimiting the travel of said actuator.

5. Actuator according to claim 1 wherein at least said power up logic circuit or said motor power supply circuit or said error signal computation circuit or said counter/downcounter or said input matching circuit is integrated into a casing containing said actuator.

* * * * *